United States Patent
Goto

(10) Patent No.: US 9,883,103 B2
(45) Date of Patent: Jan. 30, 2018

(54) IMAGING CONTROL APPARATUS AND METHOD FOR GENERATING A DISPLAY IMAGE, AND STORAGE MEDIUM

(71) Applicant: CANON KABUSHIKI KAISHA, Tokyo (JP)

(72) Inventor: Tomohiro Goto, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 265 days.

(21) Appl. No.: 14/730,607

(22) Filed: Jun. 4, 2015

(65) Prior Publication Data
US 2015/0365595 A1    Dec. 17, 2015

(30) Foreign Application Priority Data

Jun. 13, 2014 (JP) ................................ 2014-122746

(51) Int. Cl.
*H04N 7/00* (2011.01)
*H04N 5/232* (2006.01)
*H04N 5/265* (2006.01)

(52) U.S. Cl.
CPC ..... *H04N 5/23238* (2013.01); *H04N 5/23293* (2013.01); *H04N 5/265* (2013.01)

(58) Field of Classification Search
None
See application file for complete search history.

(56) References Cited

U.S. PATENT DOCUMENTS

| | | | | |
|---|---|---|---|---|
| 7,924,318 B2 * | 4/2011 | Hasegawa | ........ | G08B 13/19667 348/211.8 |
| 2002/0180878 A1 * | 12/2002 | Iida | .................... | H04N 5/23203 348/333.02 |
| 2009/0002510 A1 * | 1/2009 | Uchihashi | .............. | H04N 17/00 348/222.1 |
| 2009/0251539 A1 * | 10/2009 | Iwasaki | ............ | G08B 13/19613 348/143 |
| 2014/0118545 A1 * | 5/2014 | Iwasaki | ............ | G08B 13/19686 348/143 |

FOREIGN PATENT DOCUMENTS

JP    2009303179 A    12/2009

* cited by examiner

*Primary Examiner* — Chikaodili E Anyikire
(74) *Attorney, Agent, or Firm* — Rossi, Kimms & McDowell LLP

(57) ABSTRACT

An imaging control apparatus that controls a capturing range in which an image is captured generates a display image showing a range to be captured by image capturing performed while the capturing range is changed from one of a plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges.

20 Claims, 13 Drawing Sheets

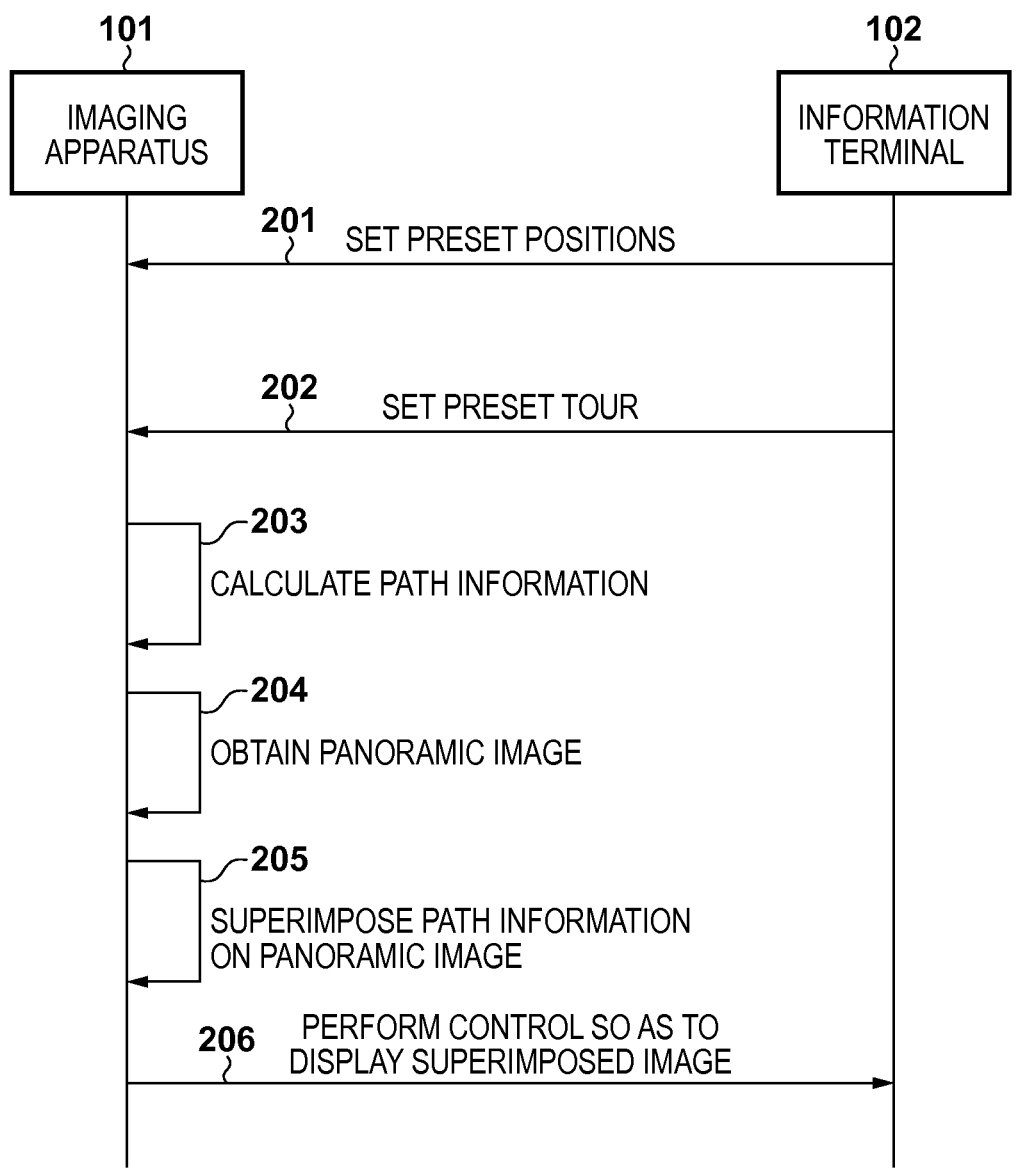

| PRESET ID 401A | PRESET NAME 402A | P ANGLE 403A | T ANGLE 404A | Z MAGNIFICATION 405A |
|---|---|---|---|---|
| 1 | PRESET 1 | -100.00 | 0.00 | 10 |
| 2 | PRESET 2 | -100.00 | -50.00 | 10 |
| 3 | PRESET 3 | 100.00 | -50.00 | 10 |
| 4 | PRESET 4 | 100.00 | 0.00 | 10 |

| TOUR ORDER 401B | PRESET ID 401A | PRESET NAME 402A | PT SPEED 402B | Z SPEED 403B | RESTING TIME 404B |
|---|---|---|---|---|---|
| 1 | 1 | PRESET 1 | MODERATE | MODERATE | 5 |
| 2 | 2 | PRESET 2 | SLOW | MODERATE | 15 |
| 3 | 3 | PRESET 3 | FAST | MODERATE | 25 |
| 4 | 4 | PRESET 4 | MODERATE | MODERATE | 15 |

F I G. 6

| 601 | 602 | 603 | 604 |
|---|---|---|---|
| PATH ID | MOVING PATH | CAPTURING RANGE | WEIGHT BASED ON MOVING SPEED/RESTING TIME |
| PRESET 1 | NONE | $110 \leq x \leq 590$<br>$115 \leq y \leq 385$ | 1 |
| PRESET 1–PRESET 2 | $x = 350$<br>$250 \leq y \leq 750$ | $110 \leq x \leq 590$<br>$115 \leq y \leq 885$ | 3 |
| PRESET 2 | NONE | $110 \leq x \leq 590$<br>$615 \leq y \leq 885$ | 2 |
| PRESET 2–PRESET 3 | $350 \leq x \leq 2650$<br>$y = 750$ | $110 \leq x \leq 2890$<br>$615 \leq y \leq 885$ | 1 |
| PRESET 3 | NONE | $2410 \leq x \leq 2890$<br>$615 \leq y \leq 885$ | 3 |
| PRESET 3–PRESET 4 | $x = 2650$<br>$250 \leq y \leq 750$ | $2410 \leq x \leq 2890$<br>$115 \leq y \leq 385$ | 2 |
| PRESET 4 | NONE | $2410 \leq x \leq 2890$<br>$115 \leq y \leq 385$ | 2 |
| PRESET 4–PRESET 1 | $350 \leq x \leq 2650$<br>$y = 250$ | $110 \leq x \leq 2890$<br>$115 \leq y \leq 385$ | 2 |

F I G. 7
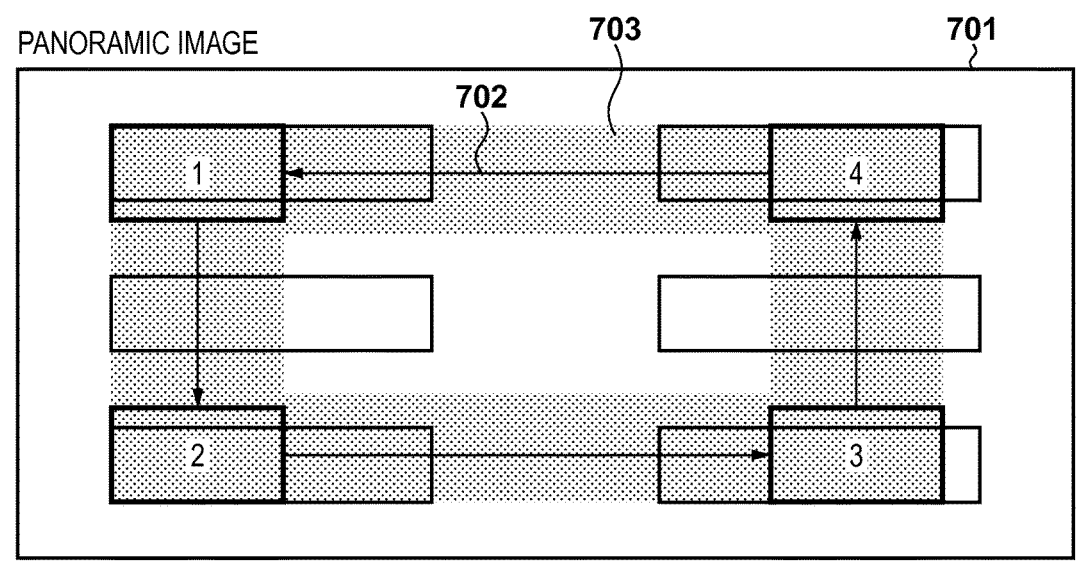
PANORAMIC IMAGE
PRESET TOUR INFORMATION
| ORDER | PRESET NAME | PT SPEED | Z SPEED | RESTING TIME |
|---|---|---|---|---|
| 1 | PRESET 1 | MODERATE | MODERATE | 5 |
| 2 | PRESET 2 | SLOW | MODERATE | 15 |
| 3 | PRESET 3 | FAST | MODERATE | 25 |
| 4 | PRESET 4 | MODERATE | MODERATE | 15 |

PRESET TOUR INFORMATION

| ORDER | PRESET NAME | PT SPEED | Z SPEED | RESTING TIME |
|---|---|---|---|---|
| 1 | PRESET 1 | MODERATE | MODERATE | 15 |
| 2 | PRESET 2 | MODERATE | MODERATE | 15 |
|  |  |  |  |  |

PANORAMIC IMAGE

PRESET TOUR INFORMATION

| ORDER | PRESET NAME | PT SPEED | Z SPEED | RESTING TIME |
|---|---|---|---|---|
| 1 | PRESET 1 | MODERATE | MODERATE | 5 |
| 2 | PRESET 2 | SLOW | MODERATE | 15 |
| 3 | PRESET 3 | FAST | MODERATE | 25 |
| 4 | PRESET 4 | MODERATE | MODERATE | 15 |

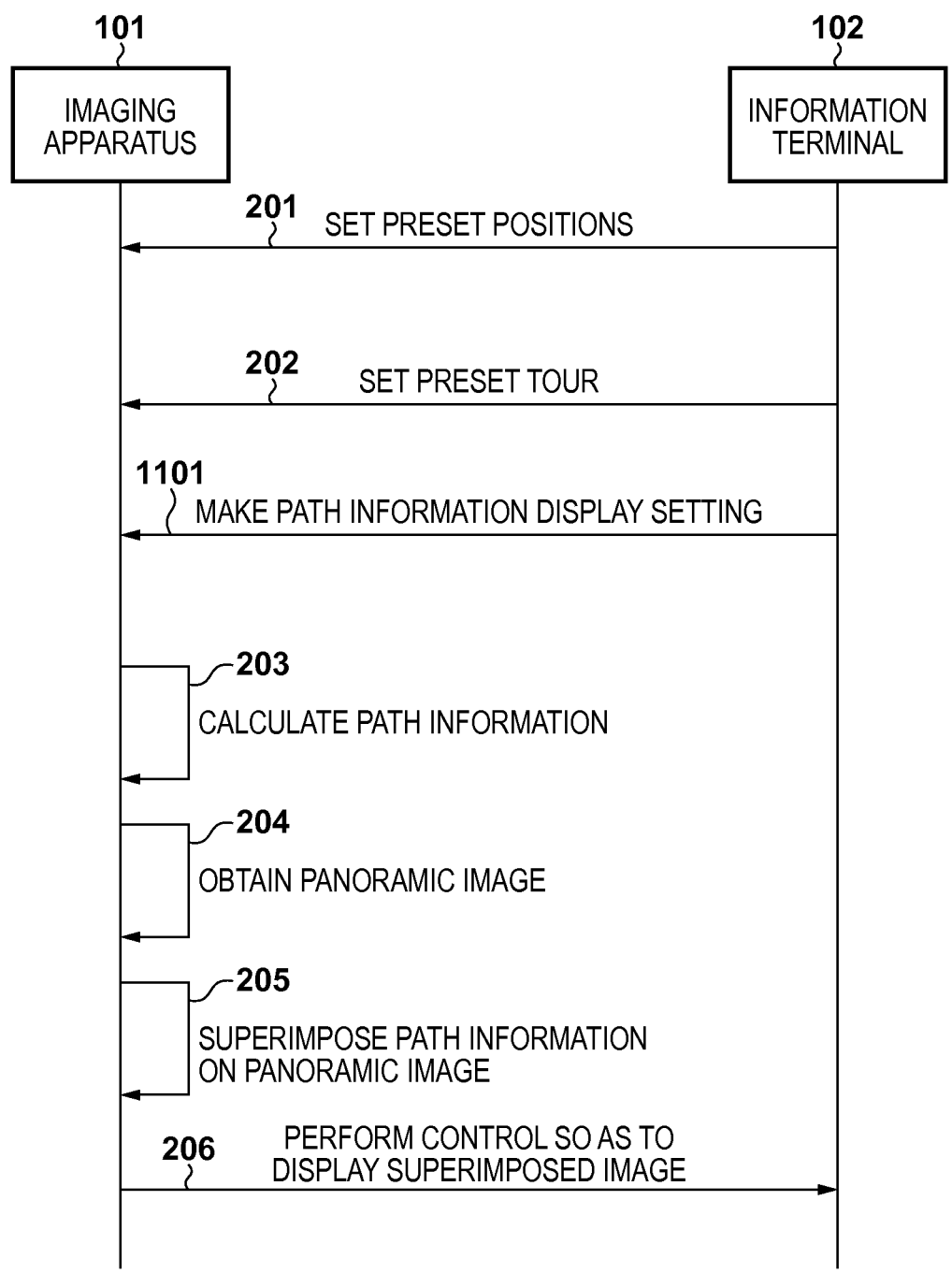

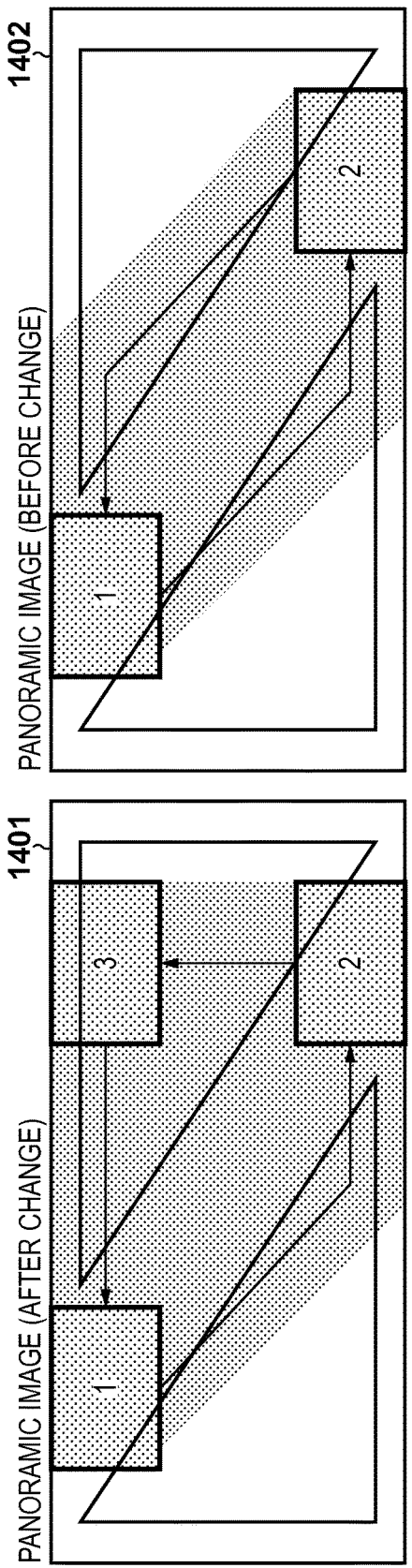

IMAGING CONTROL APPARATUS AND METHOD FOR GENERATING A DISPLAY IMAGE, AND STORAGE MEDIUM

BACKGROUND OF THE INVENTION

Field of the Invention

The present invention relates to an imaging control apparatus, a method for generating a display image, and a storage medium.

Description of the Related Art

In recent years, network cameras are used in a wide variety of applications such as monitoring and video conferencing. Some network cameras used in such applications are capable of providing pan, tilt and zoom (hereinafter, referred to as "PTZ" as appropriate) adjustments. Such network cameras may have a preset tour function of capturing images while moving the camera sequentially or randomly to preset positions which are pre-registered angles of views. According to conventional technology, in the preset tour, a path between preset positions is determined so as to be the shortest or quickest path.

Meanwhile, there is a desire among users to want to know the details (the moving path, the capturing range while the camera is moved, and the like) of image capturing during touring such as monitoring a passageway within the capturing range or monitoring a predetermined range by constant touring.

To meet this demand, the following two patent documents disclose techniques for assisting in a tour setting by presenting, to the user, the details of image capturing during a preset tour.

Japanese Patent Laid-Open No. 2009-303179 discloses that a rectangle indicating a capturing range at a preset position, a pivoting direction and the number of times of pivoting during a tour are displayed on a panoramic image obtained by capturing an entire range that can be captured by the imaging apparatus. As a result of displaying the details of image capturing as described above, the user can check the details of image capturing (the pivoting direction and the number of times of pivoting) to be performed by the tour setting.

U.S. Patent Application Publication No. 2002/0180878 discloses that the capturing ranges of the imaging device at the current and target positions are displayed on a panoramic image obtained by capturing an entire range that can be captured by the imaging apparatus. As a result of displaying the details of image capturing as described above, the user can check the details of image capturing (the capturing range while the camera is moved) to be performed by the tour setting.

However, with the technique disclosed in Japanese Patent Laid-Open No. 2009-303179, the user cannot check the moving path during a preset tour and the capturing range while the camera is moved.

Likewise, with the technique disclosed in U.S. Patent Application Publication No. 2002/0180878, it is necessary to actually move the angle of view of the imaging apparatus in order to allow the user to check the capturing range.

Accordingly, it has been difficult for the user to check whether the capturing ranges assumed by the user are covered with respect to the entire range that can be captured by the imaging apparatus when a preset tour is set. This consequently creates a mismatch between the moving path and the capturing range of the imaging apparatus and those assumed by the user, causing a possibility that the user does not notice a tour setting error or omission. In addition, in the case where the user checks the capturing range by actually moving the angle of view of the imaging apparatus, much time is required to perform the check.

SUMMARY OF THE INVENTION

The present invention allows a user to easily check a range to be captured by image capturing while changing the capturing range.

The present invention provides an imaging control apparatus that controls a capturing range in which an image is captured, the apparatus including: an obtaining unit configured to obtain settings regarding a plurality of predetermined capturing ranges; and an generating unit configured to generate a display image showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges.

The present invention provides an imaging control apparatus that controls a capturing range in which an image is captured, the apparatus including: an obtaining unit configured to obtain settings regarding a plurality of predetermined capturing ranges captured by a capturing unit; and a generating unit configured to generate a display image showing a capturing direction of the capturing unit that is changed so as to change the capturing range from one of the plurality of predetermined capturing ranges to another one of the plurality of predetermined capturing ranges, based on an ability of the capturing unit to change the capturing direction to a pan direction and an ability of the capturing unit to change the capturing direction to a tilt direction.

Further features of the present invention will become apparent from the following description of exemplary embodiments with reference to the attached drawings.

BRIEF DESCRIPTION OF THE DRAWINGS

FIG. 2 is a diagram showing a processing sequence in the imaging system according to the first embodiment.

FIG. 4A shows a table showing examples of preset position setting according to the first embodiment, and FIG. 4B shows a table showing examples of preset tour setting.

FIG. 6 shows examples of path information obtained by the path calculation unit 105 according to the first embodiment.

FIG. 7 is a diagram showing a display screen according to the first embodiment.

FIG. 11 is a diagram showing a processing sequence in an imaging system according to a second embodiment.

FIG. 13 is a diagram showing a display screen according to a third embodiment.

DESCRIPTION OF THE EMBODIMENTS

First Embodiment

Figure 1A:
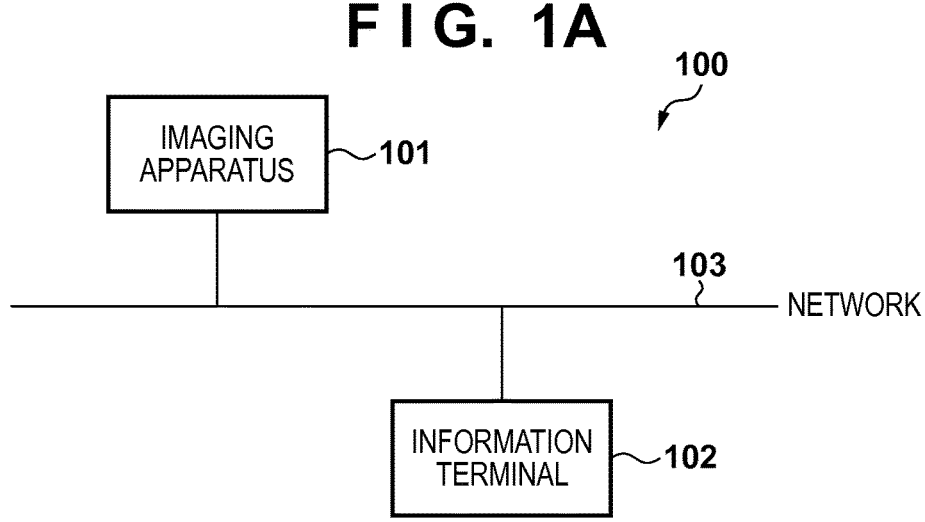
FIG. 1A is a diagram showing a configuration of an imaging system according to a first embodiment.

A first embodiment of the present invention will be described. FIG. 1A is a diagram showing a configuration of an imaging system according to the first embodiment. An imaging system 100 includes an imaging apparatus 101, an information terminal 102, and a network 103. The network 103 is a communication network such as the Internet, a WAN (Wide Area Network) or a LAN (Local Area Network), and includes a plurality of routers, switches, cables and the like.

The imaging apparatus 101 is a camera (network camera) having a variable angle of view, and is configured to distribute image data captured by the imaging apparatus via the network 103. The information terminal 102 is a computer configured to access the imaging apparatus 101 via the network 103 and perform operations such as making setting changes in the imaging apparatus 101, receiving image data captured by the imaging apparatus 101, and storing and displaying images based on the received image data.

There is no limitation on the communication standard, size and configuration of the network 103 as long as it is possible to smoothly perform communication with respect to the imaging apparatus 101 and the information terminal 102. Furthermore, the imaging system 100 may include, in addition to the information terminal 102, another information terminal configured to access the imaging apparatus 101 via the network 103. The imaging apparatus 101 is not limited to the network camera having a variable angle of view. The imaging apparatus 101 may be, for example, a fixed network camera having a digital PTZ function of clipping a desired region within a captured image and transmitting the clipped region to the information terminal.

Figure 1B:
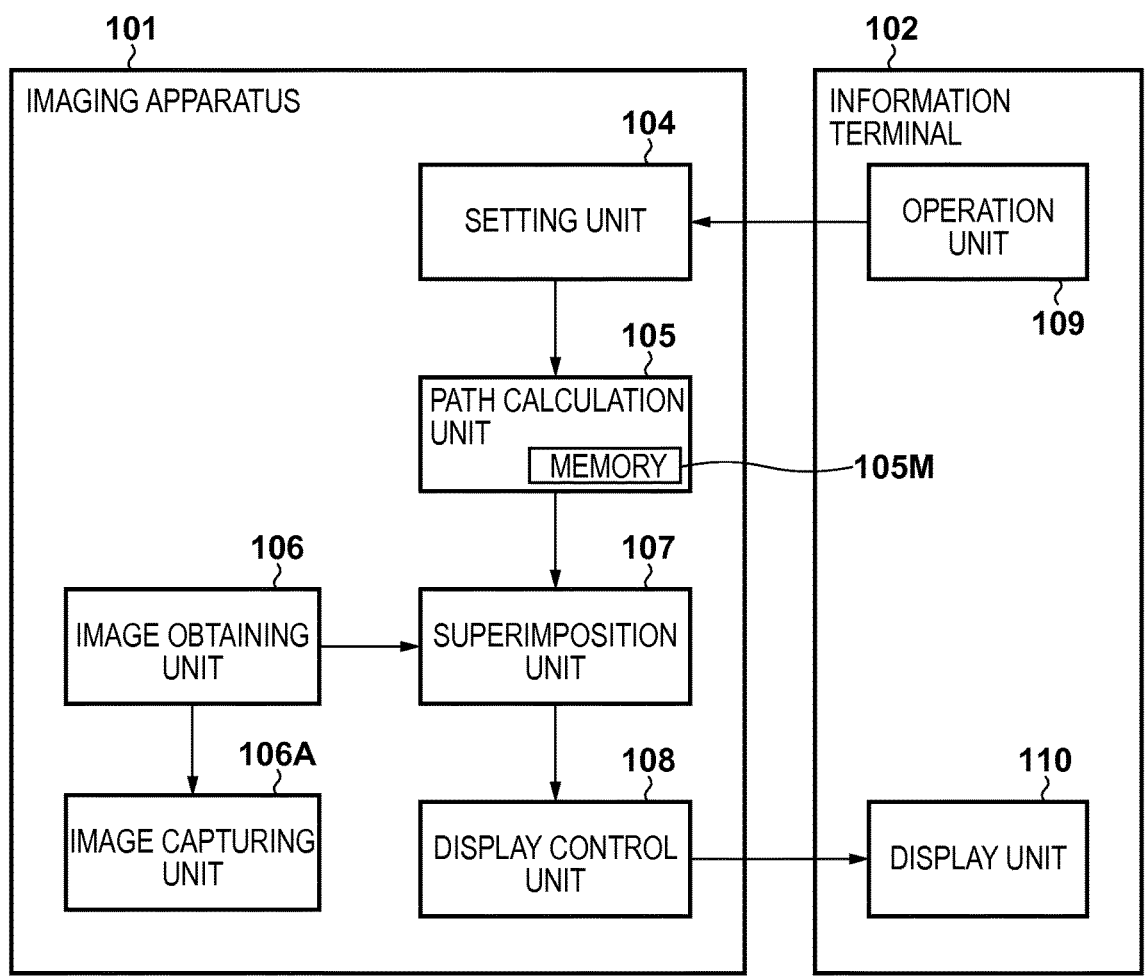
FIG. 1B is a diagram showing a configuration of an imaging apparatus and an information terminal according to the first embodiment.

FIG. 1B is a block diagram showing the imaging system according to the first embodiment. The imaging system 100 according to the present embodiment includes the imaging apparatus 101 and the information terminal 102. The imaging apparatus 101 includes a setting unit 104, a path calculation unit 105, an image obtaining unit 106, an image capturing unit 106A, a superimposition unit 107 and a display control unit 108, and the information terminal 102 includes an operation unit 109 and a display unit 110. The path calculation unit 105 includes a memory 105M.

The operation unit 109 is a user interface configured to transmit, to the imaging apparatus 101 via the network 103, a setting command for setting angle-of-view (preset position) information of the imaging apparatus 101 and a setting command for setting capture control order (preset tour) information of the imaging apparatus 101. The setting unit 104 sets the angle-of-view (preset position) information and the capture control order (preset tour) information of the imaging apparatus 101 in the path calculation unit 105 based on the setting commands received from the operation unit 109 via the network 103. The preset position information and the preset tour information will be described later in detail with reference to FIGS. 4A and 4B.

The path calculation unit 105 calculates path information including the moving path along which image capturing is performed by the imaging apparatus 101 and the capturing range of the imaging apparatus 101 based on the preset position information and the preset tour information set by the setting unit 104. The image obtaining unit 106 obtains an image (panoramic image) obtained as a result of the image capturing unit 106A capturing an entire range that can be captured by the imaging apparatus 101 from the image capturing unit 106A. The obtained panoramic image may be generated from an image captured in response to receiving an image obtaining request, or may be data that has been generated in advance.

The superimposition unit 107 superimposes the path information obtained by the path calculation unit 105 on the panoramic image obtained by the image obtaining unit 106 as superimposed information, and generates a panoramic image (superimposed image) including the path information. The display control unit 108 outputs the superimposed image generated by the superimposition unit 107 to the information terminal 102, and performs display control so as to display the superimposed image on the user interface of the information terminal 102. The display unit 110 displays the superimposed image transmitted by the display control unit 108 on the user interface.

In the present embodiment, the setting unit 104, the path calculation unit 105, the image obtaining unit 106, the superimposition unit 107 and the display control unit 108 constitute the imaging apparatus 101, but they may constitute the information terminal 102. In this case, the setting unit 104, the path calculation unit 105, the image obtaining unit 106, the superimposition unit 107 and the display control unit 108 may obtain various types of information including the image information captured by the image capturing unit 106A through communication with the imaging apparatus 101 or from the information stored in advance in the information terminal 102.

FIG. 2 is a diagram showing a processing sequence in the imaging system configuration according to the present embodiment. First, the operation unit 109 of the information terminal 102 transmits a command for setting preset position information of the imaging apparatus 101 (201). Then, the setting unit 104 of the imaging apparatus 101 sets the preset position information in the path calculation unit 105 based on the received command. Next, the operation unit 109 of the information terminal 102 transmits a command for setting preset tour information of the imaging apparatus 101 (202). Then, the setting unit 104 of the imaging apparatus 101 sets the preset tour information in the path calculation unit 105 based on the received command.

Next, the path calculation unit 105 of the imaging apparatus 101 calculates path information including the moving path and the capturing range based on the preset position information and the preset tour information set by the setting unit 104 (203). Then, the image obtaining unit 106 of the imaging apparatus 101 obtains a panoramic image as a result of the image capturing unit 106A capturing the entire range that can be captured by the imaging apparatus 101 (204). The panoramic image may be an image including the moving path and the capturing range calculated in the process 203.

The path calculation unit 105 of the imaging apparatus 101 superimposes the path information calculated in the process 203 on the panoramic image obtained in the process 204 so as to generate a superimposed image (205). Then, the display control unit 108 of the imaging apparatus 101 transmits the superimposed image (206). In the information terminal 102 that has received the superimposed image, the display unit 110 performs display processing on the user interface based on the received superimposed image.

The processes 201 and 202 described above are irregularly executed through operations of the information terminal 102 by the user, and in the imaging apparatus 101, the preset position information and the preset tour information are updated. Then, in the imaging apparatus 101, the processes 203, 204, 205 and 206 are executed again when preset position information is set or when preset tour information is set. The execution of the processes 203, 204, 205 and 206 in the imaging apparatus 101 is not limited to when preset position information is set or when preset tour information is set. The processes 203, 204, 205 and 206 may be executed, for example, when a preview operation of the preset tour information setting is checked.

Figure 3:
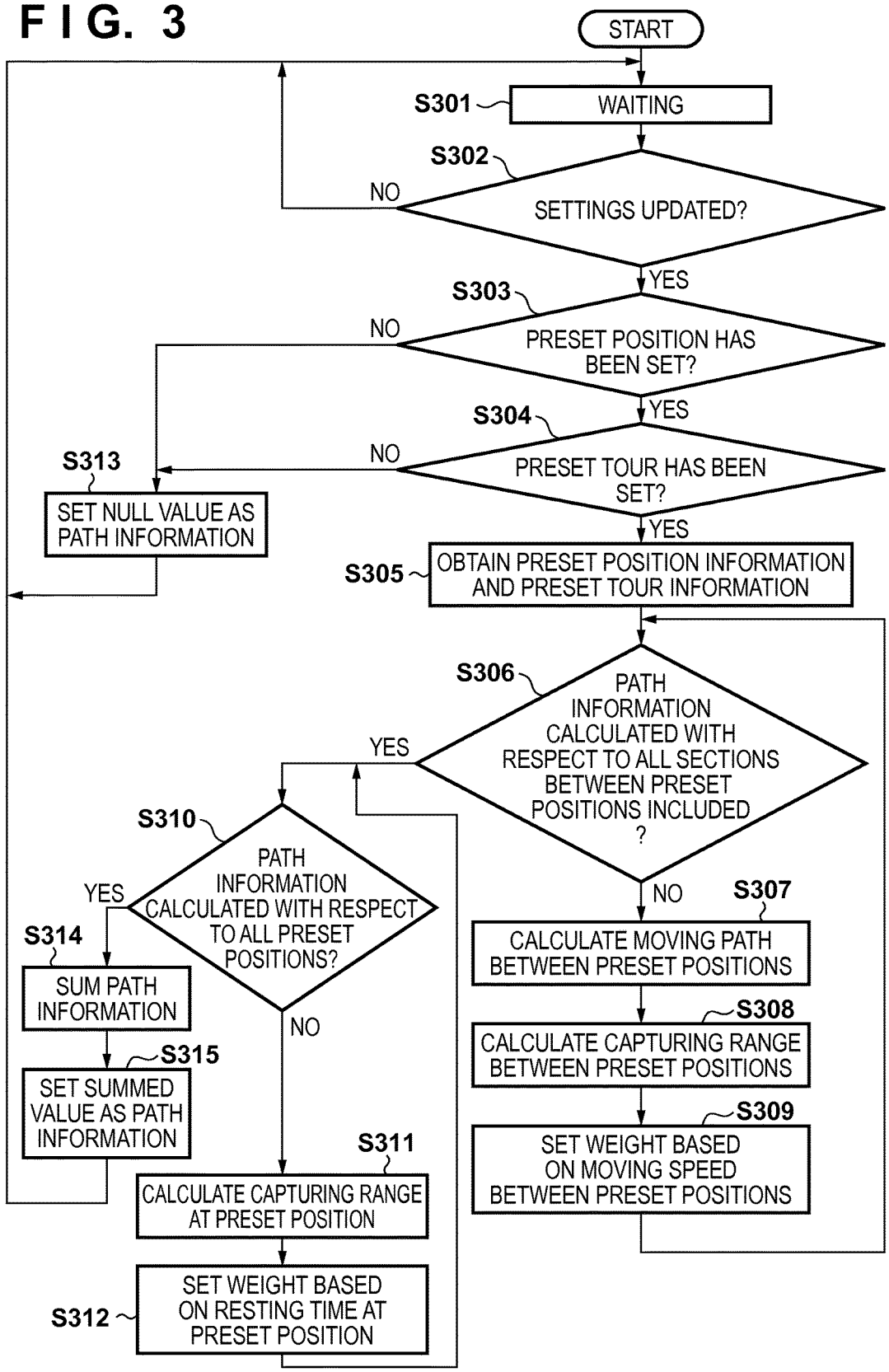
FIG. 3 is a flowchart illustrating processing performed by a path calculation unit 105 according to the first embodiment.

FIG. 3 is a flowchart illustrating processing performed by the path calculation unit 105 according to the present embodiment. This processing is performed by software control. The path calculation unit 105 is a computer, and performs the following processing by reading a program stored in the memory 105M and executing the program. The memory 105M stores therein the program that can be read by the path calculation unit 105.

In S301, the path calculation unit 105 waits for processing for a predetermined period of time, and the processing transitions to S302. In S302, the path calculation unit 105 determines whether in the setting unit 104, the path information (including the moving path and the capturing range) is unobtained, or whether the preset position information settings or the preset tour information settings have been updated. If it is determined that the path information is unobtained, or the preset position information settings or the preset tour settings have been updated (YES in S302), the processing transitions to S303. Otherwise (NO in S302), the processing transitions to S301.

In S303, the path calculation unit 105 determines whether the preset position information has been set in the setting unit 104. If it is determined that the preset position information has been set in the setting unit 104 (YES in S303), the processing transitions to S304. If it is determined that the preset position information has not been set in the setting unit 104 (NO in S303), the processing transitions to S313. In S304, the path calculation unit 105 determines whether the preset tour information has been set in the setting unit 104. If it is determined that the preset tour information has been set in the setting unit 104 (YES in S304), the processing transitions to S305. If it is determined that the preset tour information has not been set in the setting unit 104 (NO in S304), the processing transitions to S313.

In S313, the path calculation unit 105 sets a null value as the path information (including the moving path and the capturing range), and the processing transitions to S301.

In S305, the path calculation unit 105 obtains the preset position information and the preset tour information from the setting unit 104, and the processing transitions to S306. The preset position information includes the name (preset name) for the user to identify the angle of view, the PTZ values of the imaging apparatus 101, and the like. The preset tour information includes the preset position tour order, the PT speed between preset positions, the resting time at each preset position, and the like.

In S306, the path calculation unit 105 determines whether the path information (including the moving path and the capturing range) has been calculated with respect to all sections between preset positions for which the tour order is to be designated in the obtained preset tour information. If it is determined that the path information has not been calculated with respect to all sections between preset positions (NO in S306), the path calculation unit 105 selects a section between preset positions for which the path information has not been calculated, and the processing transitions to S307. Otherwise (YES in S306), the processing transitions to S310.

In S307, the path calculation unit 105 calculates the moving path of a section between preset positions, and the processing transitions to S308. The moving path is a path connecting a point defined by the PT value at a preset position before the section between preset positions selected in step S306 is moved and a point defined by the PT value at a preset position after the section between preset positions is moved. The moving path is calculated based on the PTZ control ability of the imaging apparatus 101. The moving path will be described later in detail with reference to FIGS. 5A and 5B.

In S308, the path calculation unit 105 calculates a capturing range between preset positions, and the processing transitions to S309. The capturing range is a capturing range when moving along the moving path calculated in step S307, and is calculated based on the moving path and the PTZ control ability of the imaging apparatus 101.

In S309, the path calculation unit 105 performs weight assignment based on the moving speed between preset positions, and the processing returns to S306. The time required by image capturing while moving between preset positions becomes shorter as the moving speed is higher, and becomes longer as the moving speed is lower. Accordingly, the path calculation unit 105 determines that the capturing range is more important as, for example, the moving speed between preset positions is lower.

In S310, the path calculation unit 105 determines whether the path information has been calculated with respect to all of the preset positions for which the tour order is to be designated in the obtained preset tour information. If it is determined that the path information has not been calculated with respect to all of the preset positions (NO in S310), the path calculation unit 105 selects a capturing range at a preset position for which the path information has not been calculated, and the processing transitions to S311. Otherwise (YES in S310), the processing transitions to S314.

In S311, the path calculation unit 105 calculates the capturing range at the preset position, and the processing transitions to S312. The capturing range is a capturing range at the preset position selected in step S310. The capturing range is calculated based on the PTZ values at the preset position.

In S312, the path calculation unit 105 performs weight assignment based on the resting time at the preset position, and the processing returns to S310. The time required by image capturing at a preset position becomes shorter as the resting time is shorter, and becomes longer as the resting time is longer. Accordingly, the path calculation unit 105 determines to, for example, place a greater importance as the resting time at the preset position is longer.

In S314, the path calculation unit 105 sums the path information calculated in steps S306 to S312, and the processing transitions to S315. The path information summed by the path calculation unit 105 will be described later with reference to FIG. 6. In S315, the path calculation unit 105 sets the summed information obtained in S314 as the path information (including the moving path and the capturing range), and the processing transitions to S301.

FIG. 4A shows an example of the preset position information obtained by the path calculation unit 105 of the present embodiment in step S305 of obtaining preset position information and preset tour information. Preset position information 400A includes preset ID 401A, preset name 402A, P angle 403A, T angle 404A, and Z magnification 405A.

The preset ID 401A indicates the ID for uniquely identifying a preset position in the imaging system. The preset name 402A indicates a preset name, which is an arbitrary character string set by the user through the use of the operation unit 109 when a preset position is set. The P angle 403A indicates a P angle (pan angle) of the imaging apparatus 101 set by the user through the use of the operation unit 109 when a preset position is set. The T angle 404A indicates a T angle (tilt angle) of the imaging apparatus 101 set by the user through the use of the operation unit 109 when a preset position is set. The Z magnification 405A indicates a Z magnification (zoom magnification) of the imaging apparatus 101 set by the user through the use of the operation unit 109 when a preset position is set.

FIG. 4B shows an example of the preset tour information obtained by the path calculation unit 105 of the present embodiment in step S305 of obtaining preset position information and preset tour information. Preset tour information 400B includes the preset ID 401A, the preset name 402A, tour order 401B, PT speed 402B, Z speed 403B, and resting time 404B.

The tour order 401B indicates the number representing the order in which a preset position listed in the preset tour information 400B is processed during the preset tour. The user selects the preset ID 401 or the preset name 402A of a preset position to be toured in the order specified by the tour order 401B from among the preset position information 400A that has been set in advance.

The PT speed 402B indicates the PT speed (pan tilt speed) of the imaging apparatus 101, which is set to a predetermined value by the user through the use of the operation unit 109 when a preset tour is set. The PT speed 402B can be selected from, for example, "fast", "moderate" and "slow". The Z speed 403B indicates the Z speed (zoom speed) of the imaging apparatus 101 set by the user when a preset tour is set. The Z speed 403B can be selected from, for example, "fast", "moderate" and "slow" through the use of the operation unit 109. The resting time 404B indicates the resting time (for example, the number of seconds) of the imaging apparatus 101 at a position indicated by the preset ID 401A, which is set to a predetermined value by the user through the use of the operation unit 109 when a preset tour is set.

The selection candidates for the PT speed 402B and the Z speed 403B are not limited to "fast", "moderate" and "slow". The speeds may be expressed or rated in a different manner such as "very fast" and "very slow", or may be designated by a numerical value or the like.

Figure 5A:
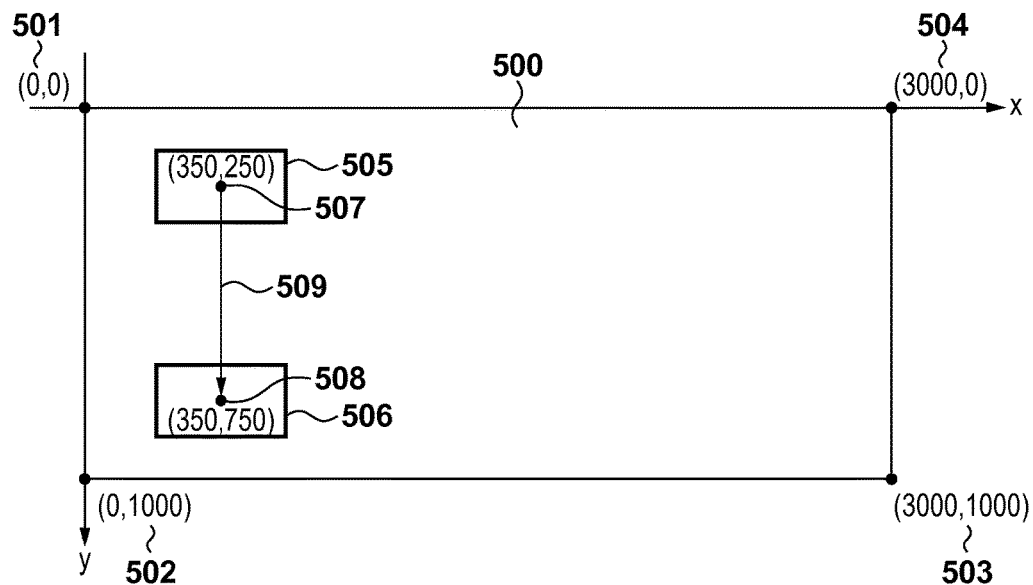
FIG. 5A shows an example of capturing ranges obtained by the path calculation unit 105 according to the first embodiment.

Next is a description of the moving path calculated by the path calculation unit 105 of the present embodiment in step S307. FIG. 5A shows an example of the moving path calculated by the path calculation unit 105. A capturable range 500 is the range obtained by projecting the entire range that can be captured by the imaging apparatus 101 onto a two-dimensional coordinate system. A point 501 has coordinates (0, 0), which represents the upper left corner of the capturable range 500. A point 502 has coordinates (0, 1000), which represents the lower left corner of the capturable range 500. A point 504 has coordinates (3000, 0), which represents the upper right corner of the capturable range 500. A point 503 has coordinates (3000, 1000), which represents the lower right corner of the capturable range 500.

A capturing range 505 is the capturing range at a preset position before being moved, the preset position being one of two preset positions of the section between preset positions selected in step S306. The capturing range 505 is determined according to the P angle 403A, the T angle 404A and the Z magnification 405A corresponding to the preset ID 401A. A capturing range 506 is the capturing range at a preset position after being moved, the preset position being the other one of the two preset positions of the section between preset positions selected in step S306. The capturing range 506 is determined according to the P angle 403A, the T angle 404A and the Z magnification 405A corresponding to the preset ID 401A.

A point 507 has coordinates (350, 250), which represents the center of the capturing range 505 and corresponds to the PT value of the capturing range 505. A point 508 has coordinates (350, 750), which represents the center of the capturing range 506 and corresponds to the PT value of the capturing range 506.

A moving path 509 is the moving path in the section between preset positions selected in step S306. The moving path 509 is based on the PTZ control ability of the imaging apparatus 101, and is a straight or curved line connecting the point 507 and the point 508 in the capturable range 500, or a combination thereof. For example, if the imaging apparatus 101 is a model that cannot simultaneously perform P control and T control, and that prioritizes the P control over the T control, the path calculation unit 105 calculates the moving path in the case where the T control (Y-direction control in the capturable range 500) is performed after the P control (X-direction control in the capturable range 500). For example, in FIG. 5A, the moving path satisfies x=350 and 250≤y≤750.

As information indicating the moving path, a collection of points may be used. It is also possible to use points (for example, the points at the upper left corners, or the like) in the capturing range 505 and the capturing range 506 other than those at the centers.

Also, the path calculation unit 105 may obtain the moving path by using a calculation table prepared in advance based on the point 507 and the point 508.

Figure 5B:
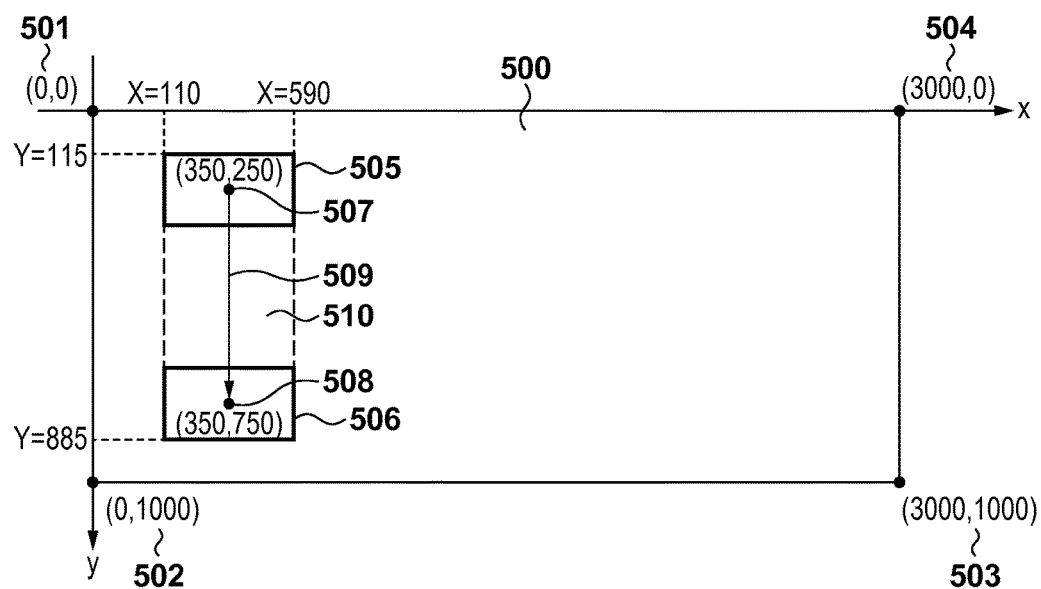
FIG. 5B shows an example of path information obtained by the path calculation unit 105 according to the first embodiment.

Next is a description of the capturing range calculated by the path calculation unit 105 of the present embodiment in step S308 or S311. FIG. 5B shows an example of the capturing range calculated by the path calculation unit 105. A capturing range 510 is the capturing range in the section between preset positions selected in step S306 or the capturing range at the preset position selected in step S310. The capturing ranges 505 and 506 at the preset positions are determined according to the P angle 403A, the T angle 404A and the Z magnification 405A corresponding to the preset ID 401A.

Also, the capturing range in the section between preset positions is determined based on the moving path 509 obtained in S307, the Z magnification 405A and the Z speed 403B. For example, if the imaging apparatus 101 is a model that cannot simultaneously perform PT control and Z control, and that prioritizes the Z control over the PT control, the path calculation unit 105 calculates the capturing range in the case where the PT control (XY-direction control in the capturable range 500) is performed after the Z control (changing the zoom magnification). If the imaging apparatus 101 is a model that can simultaneously perform PT control and Z control, the path calculation unit 105 obtains the capturing range through calculation taking into consideration changes in the capturing range while moving to change the angle of view caused by the Z control (changing the zoom magnification and the speed) executed in conjunction with the PT control.

For example, in FIG. 5B, the capturing range 510 satisfies 110≤x≤590 and 115≤y≤885. As information indicating the capturing range, a collection of points may be used.

Next is a description of the weight assignment performed by the path calculation unit 105 in step S309. The weight assigned in step S309 represents the degree of importance of the capturing range obtained in S308, and a greater weight value means a greater importance of the capturing range. Accordingly, the path calculation unit 105 determines that the capturing range is more important as the moving speed between preset positions is lower, and thus assigns a greater weight value as the moving speed is lower.

For example, the path calculation unit 105 assigns a weight of "1" if the moving speed is "fast", a weight of "2" if the moving speed is "moderate", and a weight of "3" if the moving speed is "slow". Conversely, the path calculation unit 105 may be configured to assign a greater weight value as the moving speed between preset positions is higher. The weight values are not limited to "1" to "3" described above. For example, different weight levels such as "1" to "5" may be used, or the weight may be indicated by expressions such as "important" and "moderate".

Next is a description of the weight assignment performed by the path calculation unit 105 in step S312. The weight assigned in S312 represents the degree of importance of the capturing range calculated in S311, and a greater weight value means a greater importance of the capturing range. In the image capturing at a preset position, the path calculation unit 105 determines that the capturing range is more important as the resting time is longer, and thus assigns a greater weight value as the resting time is longer.

For example, the path calculation unit 105 assigns a weight of "1" if the resting time is "less than 10 seconds", a weight of "2" if the resting time is "10 seconds or more and less than 20 seconds", and a weight of "3" if the resting time is "20 seconds or more". Conversely, the path calculation unit 105 may be configured to assign a greater weight value as the resting time is shorter. The weight values are not limited to "1" to "3" described above. For example, different weight levels may be used.

Next is a description of the path information summed by the path calculation unit 105 of the present embodiment in step S314 of summing path information. FIG. 6 shows an example of the path information summed by the path calculation unit 105. Path information 600 includes path ID 601, moving path 602, capturing range 603 and weight 604.

The path ID 601 indicates the ID for uniquely identifying path information in the imaging system. The path IDs of the sections between preset positions for which the moving path was calculated in steps S306 to S309 are written in the form of "<preset name>-<preset name>". Likewise, the path IDs of the preset positions for which the capturing range was calculated in steps S310 to S312 are written in the form of "<preset name>".

The moving path 602 indicates the moving path calculated in S307. In the case of a preset position, there is no corresponding moving path, and thus "none" is written. The capturing range 603 indicates the capturing range calculated in S308 or S311. The weight 604 indicates the weight assigned in step S309 or step S312. For example, in FIG. 6, with respect to the path information corresponding to a path ID of "preset 1", "none" is written as the moving path, "110≤x≤590 and 115≤y≤385" is written as the capturing range, and "1" is written as the weight.

FIG. 7 is a diagram showing a display screen according to the present embodiment. The display screen is obtained by the superimposition unit 107 superimposing the path information obtained by the path calculation unit 105 on the panoramic image obtained by the image obtaining unit 106. In the display screen shown in FIG. 7 as well as the display screens shown in FIGS. 8 to 10, 13 and 14, which will be described later, the panoramic images on which the path information is superimposed and the preset tour information are shown, but the display of preset tour information is not limited to the examples shown in these diagrams.

A panoramic image 701 is a panoramic image obtained by the image obtaining unit 106. Arrows 702 are arrows superimposed on the panoramic image 701 based on the moving path 602. As shown in the diagram, the superimposition unit 107 superimposes the arrows 702, which are based on the moving path 602, on the panoramic image, so as to visually show the moving path. A region 703 is a region superimposed on the panoramic image 701 based on the capturing range 603. As shown in the diagram, the superimposition unit 107 superimposes the capturing range 603 on the panoramic image as the region 703 so as to visually show the capturing range. The shape, color and the like of the arrows 702 are not limited to those of the example shown in FIG. 7. Likewise, the shape, color and the like of the region 703 are not limited to those of the example shown in FIG. 7.

Figure 8:
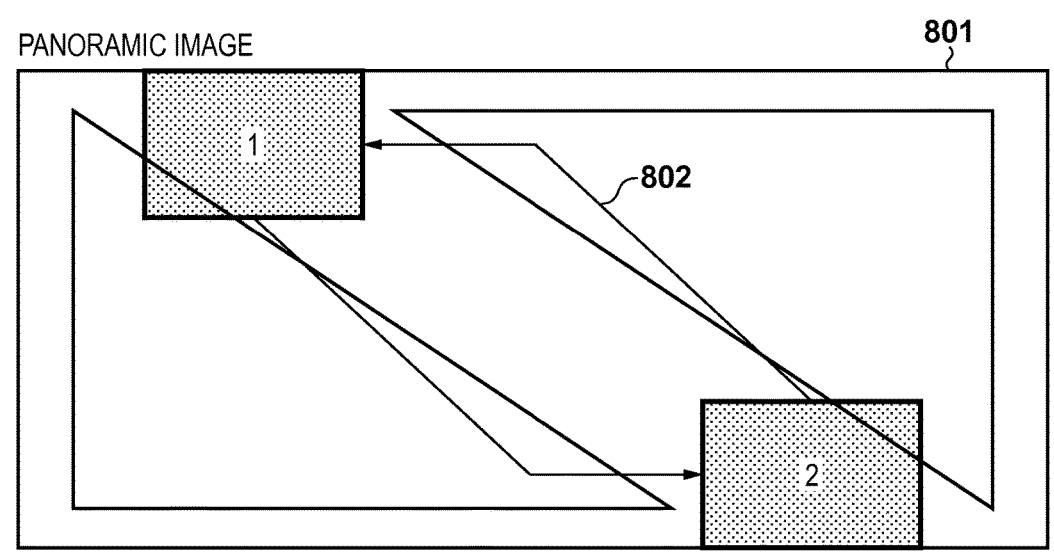
FIG. 8 is a diagram showing a display screen according to the first embodiment.

FIG. 8 is a diagram showing another display screen according to the present embodiment. A panoramic image 801 is a panoramic image obtained by the image obtaining unit 106. Arrows 802 are arrows superimposed on the panoramic image 801 based on the moving path 602. As shown in the diagram, the superimposition unit 107 superimposes the arrows 802 on the panoramic image 801 based on the moving path 602, so as to visually show the moving path. With the arrows 802, it can be seen that the moving path between preset 1 and preset 2 includes different outward and return paths. FIG. 8 shows a display screen in the case where the imaging apparatus 101 is capable of PT simultaneous control (only in the 45, 135, 225 and 315 degree directions) and has the ability of prioritizing the PT simultaneous control over P control or T control.

Figure 9:
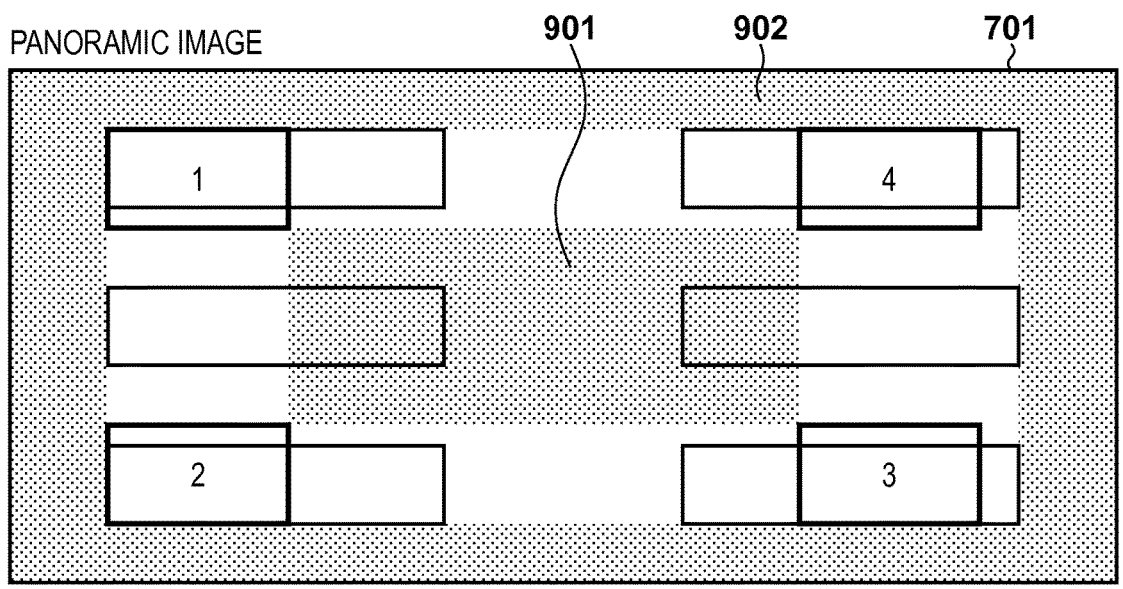
FIG. 9 is a diagram showing a display screen according to the first embodiment.

FIG. 9 is a diagram showing another display screen according to the present embodiment. Regions 901 and 902 are regions superimposed on the panoramic image 701 based on the capturing range 603. As shown in the diagram, the regions 901 and 902 obtained by excluding the capturing range 603 from the capturable range 500 are superimposed on the panoramic image 701, so as to visually show the regions. With the regions 901 and 902, it is possible to view the regions that are not to be captured by the preset tour setting.

Figure 10:
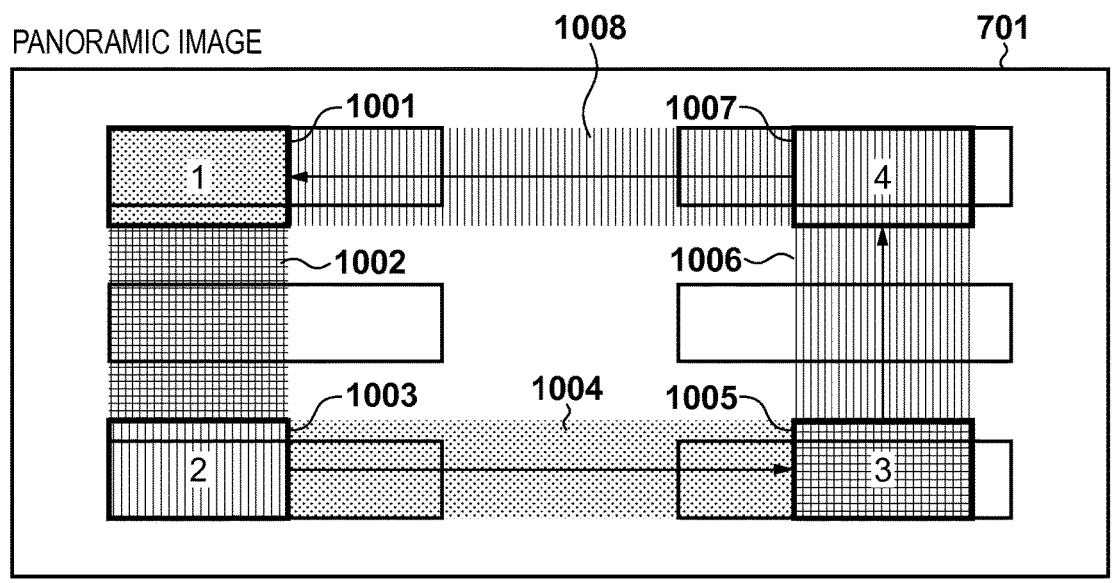
FIG. 10 is a diagram showing a display screen according to the first embodiment.

FIG. 10 is a diagram showing another display screen according to the present embodiment. Regions 1001 to 1008 are regions superimposed on the panoramic image 701 based on the capturing range 603 and the weight 604. As shown in the diagram, pattern to be superimposed are determined according to the weight 604, and the capturing ranges 603 are superimposed on the panoramic image as the regions 1001 to 1008, so as to visually show the capturing ranges. With the regions 1001 to 1008, the length of the capturing time can be seen based on the pattern images. The PT speed and the Z speed of preset 1 are the PT speed and the Z speed when moving from preset 4 to preset 1. Likewise, the PT speed and the Z speed of preset 2 are the PT speed and the Z speed when moving from preset 1 to preset 2.

For example, in FIG. 10, a weight of "1" is determined with respect to the regions 1001 and 1004, and thus a dot pattern is superimposed on the regions. A weight of "2" is determined with respect to the regions 1003, 1006, 1007 and 1008, and thus a vertical stripe pattern is superimposed on the regions. A weight of "3" is determined with respect to the regions 1002 and 1005, and thus a grid pattern is superimposed on the regions. Here, the degree of importance of the moving path between preset positions is determined based on the PT speed, but may be determined taking the Z speed into consideration if the Z value is changed.

The images and the like that are superimposed on the regions 1001 to 1008 are not limited to those of the example shown in FIG. 10. For example, the differences in weight may be indicated by density or color, instead of based on the patterns. It is also possible to use a pop-up message or signaling such as flashing so as to enable the user to recognize the differences in weight.

As described above, according to the present embodiment, it is possible to visually present, to the user, the moving path, the capturing range, the non-capturing range and the length of the capturing time, without actually moving the angle of view of the imaging apparatus. It is thereby possible to make settings having few preset tour setting errors and omissions in a short time.

Second Embodiment

In a second embodiment, an example of an imaging system capable of performing control so as to enable/disable the display of the moving path, the capturing range, the non-capturing range and the length of the capturing time will be described.

FIG. 11 is a sequence diagram in a system configuration according to the second embodiment. Processes 201 to 206 are the same as those described in the first embodiment. In the present embodiment, after the process 202, the operation unit 109 of the information terminal 102 transmits a command for making a path information display setting in the imaging apparatus 101 (1101). Then, the setting unit 104 of the imaging apparatus 101 makes a path information display setting based on the received command.

The processing performed by the path calculation unit 105 of the present embodiment will be described with reference to FIG. 3. In the present embodiment, in addition to the processing shown in FIG. 3, a determination is made between S302 and S303 as to whether the path information display setting is enabled.

In other words, if it is determined in S302 that the path information is unobtained, or that the preset position settings or the preset tour settings have been updated (YES in S302), then, it is determined whether the path information display setting is enabled. If it is determined that the path information display setting is enabled, the processing transitions to S303. Otherwise, the processing transitions to S313.

Figure 12A:
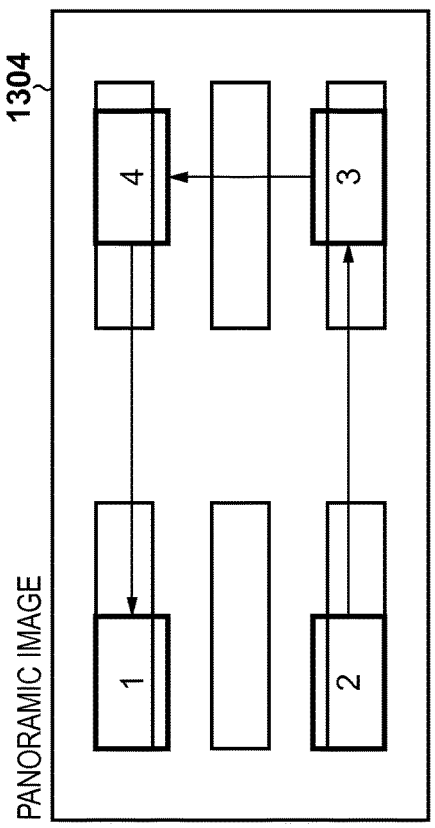
FIGS. 12A and 12B are diagrams showing display screens according to the second embodiment.
Figure 12B:
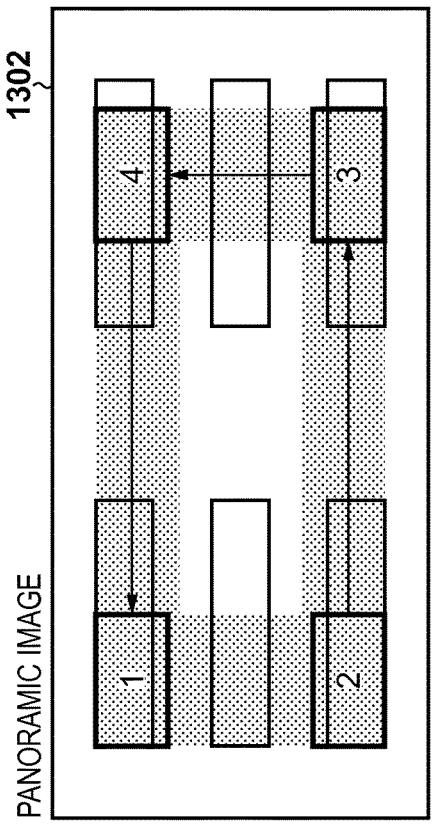

FIGS. 12A and 12B show display screens according to the present embodiment. FIG. 12A is the display screen when the path information display setting is enabled. A checkbox 1301 is a checkbox for indicating whether the path information display setting is enabled or disabled, and in this example, the path information display setting is enabled. A panoramic image 1302 is a panoramic image on which the path information 600 is superimposed as a result of a checkmark being placed in the checkbox 1301.

FIG. 12B is the display screen when the path information display setting is disabled. A checkbox 1303 is a checkbox for indicating whether the path information display setting is enabled or disabled, and in this example, the path information display setting is disabled. A panoramic image 1304 is a panoramic image on which the path information 600 is not superimposed. The display of the checkbox is not limited to that of the example shown in FIGS. 12A and 12B.

As described above, according to the second embodiment, the user can also check the original image in the region on which the path information is superimposed, and thus it is possible to make settings having few preset tour setting errors and omissions in a shorter time.

Third Embodiment

In a third embodiment, an example of an imaging system that further performs display of the moving path, the capturing range, the non-capturing range and the length of the capturing time based on settings that are set in the information terminal 102 and are not saved in the imaging apparatus 101 will be described.

FIG. 13 is a diagram showing a display screen according to the present embodiment. A panoramic image 1402 is a panoramic image on which path information calculated based on settings that are set in the information terminal 102 (before update) and are not saved in the imaging apparatus 101 is superimposed. On the other hand, a panoramic image 1401 is a panoramic image on which path information calculated based on the settings saved in the imaging apparatus 101 (updated settings) is superimposed.

The display control unit 108 is capable of performing control so as to display the panoramic image 1401 and the panoramic image 1402 side by side as shown in FIG. 13, performing control so as to display either one of the panoramic images, or performing control so as to change the display by switching between the panoramic image before update and the panoramic image after update.

As described above, according to the third embodiment, the user can further set preset position information and a preset tour setting while comparing the path information based on the saved settings and the path information based on the settings that are not saved. Accordingly, it is possible to make settings having fewer preset tour setting errors and omissions in a short time.

According to the embodiment described above, the user can check the moving path and the capturing range based on the settings with respect to the capturable range of the imaging apparatus when a preset tour is set, and thus settings having fewer preset tour setting errors and omissions can be made. Also, the user can check the moving path and the capturing range without controlling the angle of view, and thus the time required to check the settings can be shortened.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-122746, filed Jun. 13, 2014, which is hereby incorporated by reference herein in its entirety.

What is claimed is:

1. An imaging control apparatus that controls a capturing range in which an image is captured, the apparatus comprising:
   an obtaining unit configured to obtain settings regarding a plurality of predetermined capturing ranges and settings regarding an order in which the plurality of predetermined capturing ranges are captured; and
   a generating unit configured to generate a display image showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges, based on the settings regarding the plurality of predetermined capturing ranges and the settings regarding the order in which the plurality of predetermined capturing ranges are captured.

2. The apparatus according to claim 1,
   wherein the generating unit is configured to generate a display image showing a range to be captured by image capturing performed while the capturing range is sequentially changed from one of the plurality of predetermined capturing ranges to another one of the plurality of predetermined capturing ranges so as to tour through the plurality of predetermined capturing ranges by the image capturing, or a range not to be captured by the image capturing.

3. The apparatus according to claim 2,
   wherein the generating unit is configured to change the display image according to changes in the plurality of capturing ranges that are toured.

4. The apparatus according to claim 1,
   wherein the generating unit is configured to generate a display image showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges, in a capturable range that can be captured by an image capturing unit by changing the capturing range of the image capturing unit.

5. The apparatus according to claim 4,
   wherein the generating unit has a mode in which an image showing the capturable range and the display image are superimposed and displayed and a mode in which the image showing the capturable range is displayed without the display image being superimposed thereon.

6. The apparatus according to claim 1,
   wherein the generating unit is configured to generate a display image showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges, according to a change ability of a changing unit for changing a capturing direction to a pan direction and a tilt direction.

7. The apparatus according to claim 1,
   wherein the generating unit is configured to generate a display image showing a range to be captured by image capturing performed while the capturing range is changed from one of the plurality of predetermined capturing ranges to another one of the plurality of predetermined capturing ranges and a speed at which the capturing range is changed.

8. The apparatus according to claim 1,
   wherein the generating unit is configured to generate a display image showing a range to be captured by image capturing performed while the capturing range is changed from one of the plurality of predetermined capturing ranges to another one of the plurality of predetermined capturing ranges, a time required to capture the one of the plurality of predetermined capturing ranges, and a time required to capture the another one of the plurality of predetermined capturing ranges.

9. The apparatus according to claim 1,
   wherein the generating unit includes a transmission unit configured to transmit the generated display image via a network.

10. The apparatus according to claim 1,
    wherein the generating unit is configured to obtain a captured image captured by an imaging apparatus via a network so as to superimpose the obtained captured image and the display image.

11. A method for generating a display image in an imaging control apparatus that controls a capturing range in which an image is captured, the method comprising:
    obtaining settings regarding a plurality of predetermined capturing ranges and settings regarding an order in which the plurality of predetermined capturing ranges are captured; and
    generating a display image showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges, based on the settings regarding the plurality of predetermined capturing ranges and the settings regarding the order in which the plurality of predetermined capturing ranges are captured.

12. The method according to claim 11, comprising generating a display image showing a range to be captured by image capturing performed while the capturing range is sequentially changed from one of the plurality of predetermined capturing ranges to another one of the plurality of predetermined capturing ranges so as to tour through the plurality of predetermined capturing ranges by the image capturing, or a range not to be captured by the image capturing.

13. The method according to claim 11, comprising generating a display image showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges, in a capturable range that can be captured by an image capturing unit by changing the capturing range of the image capturing unit.

14. A non-transitory storage medium storing a computer program that generates a display image,
wherein the computer program is configured to:
obtain settings regarding a plurality of predetermined capturing ranges and settings regarding an order in which the plurality of predetermined capturing ranges is captured; and
generate a display image showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges, based on the settings regarding the plurality of predetermined capturing ranges and the settings regarding the order in which the plurality of predetermined capturing ranges are captured.

15. The storage medium according to claim 14,
wherein the computer program is configured to:
generate a display image showing a range to be captured by image capturing performed while the capturing range is sequentially changed from one of the plurality of predetermined capturing ranges to another one of the plurality of predetermined capturing ranges so as to tour through the plurality of predetermined capturing ranges by the image capturing, or a range not to be captured by the image capturing.

16. The storage medium according to claim 14,
wherein the computer program is configured to:
generate a display image showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges, in a capturable range that can be captured by an image capturing unit by changing the capturing range of the image capturing unit.

17. An imaging control apparatus that controls a capturing range in which an image is captured, the apparatus comprising:
an obtaining unit configured to obtain settings regarding a plurality of predetermined capturing ranges captured by a capturing unit and settings regarding an order in which the plurality of predetermined capturing ranges is captured; and
a generating unit configured to generate a display image showing a capturing direction of the capturing unit that is changed so as to change the capturing range from one of the plurality of predetermined capturing ranges to another one of the plurality of predetermined capturing ranges, based on an ability of the capturing unit to change the capturing direction to a pan direction and an ability of the capturing unit to change the capturing direction to a tilt direction, and showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges, based on the settings regarding the plurality of predetermined capturing ranges and the settings regarding the order in which the plurality of predetermined capturing ranges are captured.

18. The apparatus according to claim 17,
wherein the generating unit is configured to generate a display image showing the capturing direction of the capturing unit that is changed so as to change the capturing range from one of the plurality of predetermined capturing ranges to another one of the plurality of predetermined capturing ranges and a display image showing the capturing direction of the capturing unit that is changed so as to change the capturing range from said another one of the plurality of predetermined capturing ranges to said one of the plurality of predetermined capturing ranges.

19. An imaging control method for controlling a capturing range in which an image is captured, the method comprising:
obtaining settings regarding a plurality of predetermined capturing ranges captured by an image capturing unit and settings regarding an order in which the plurality of predetermined capturing ranges is captured by the image capturing unit; and
generating a display image showing a capturing direction of the image capturing unit that is changed so as to change the capturing range from one of the plurality of predetermined capturing ranges to another one of the plurality of predetermined capturing ranges, based on an ability of the image capturing unit to change the capturing direction to a pan direction and an ability of the image capturing unit to change the capturing direction to a tilt direction, and showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges, based on the settings regarding the plurality of predetermined capturing ranges and the settings regarding the order in which the plurality of predetermined capturing ranges are captured.

20. A non-transitory storage medium storing a computer program that generates a display image, wherein the computer program is configured to:

obtain settings regarding a plurality of predetermined capturing ranges captured by an image capturing unit and settings regarding an order in which the plurality of predetermined capturing ranges is captured by the image capturing unit; and generating a display image showing a capturing direction of the image capturing unit that is changed so as to change the capturing range from one of the plurality of predetermined capturing ranges to another one of the plurality of predetermined capturing ranges, based on an ability of the image capturing unit to change the capturing direction to a pan direction and an ability of the image capturing unit to change the capturing direction to a tilt direction, and showing a range to be captured by image capturing performed while the capturing range is changed from one of the plurality of predetermined capturing ranges to another one of the plurality of predetermined capturing ranges or a range not to be captured by the image capturing performed while the capturing range is changed from one of the plurality of predetermined capturing ranges to another one of the plurality of predetermined capturing ranges, based on the settings regarding the plurality of predetermined capturing ranges and the settings regarding the order in which the plurality of predetermined capturing ranges are captured.

* * * * *